United States Patent
Ryu

(10) Patent No.: US 11,429,484 B2
(45) Date of Patent: Aug. 30, 2022

(54) MEMORY, ERROR RESTORATION METHOD OF THE MEMORY, AND BATTERY DEVICE COMPRISING THE MEMORY

(71) Applicant: LG CHEM, LTD., Seoul (KR)

(72) Inventor: Jesung Ryu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/282,804

(22) PCT Filed: Jan. 17, 2020

(86) PCT No.: PCT/KR2020/000875
§ 371 (c)(1),
(2) Date: Apr. 5, 2021

(87) PCT Pub. No.: WO2020/149703
PCT Pub. Date: Jul. 23, 2020

(65) Prior Publication Data
US 2021/0349779 A1 Nov. 11, 2021

(30) Foreign Application Priority Data
Jan. 17, 2019 (KR) .................. 10-2019-0006275

(51) Int. Cl.
*G11C 29/00* (2006.01)
*G06F 11/10* (2006.01)
(Continued)

(52) U.S. Cl.
CPC ............ *G06F 11/1068* (2013.01); *G06F 1/30* (2013.01); *G06F 11/0772* (2013.01); *G06F 11/1004* (2013.01); *G06F 11/1417* (2013.01)

(58) Field of Classification Search
CPC ............ G06F 11/1068; G06F 11/0772; G06F 11/1004; G06F 11/1417; G06F 1/30
See application file for complete search history.

(56) References Cited

U.S. PATENT DOCUMENTS 6,473,856 B1 10/2002 Goodwin et al.
8,589,730 B2 11/2013 Byom et al.
(Continued)

FOREIGN PATENT DOCUMENTS

JP 2005-531846 A 10/2005
JP 2014-522070 A 8/2014
(Continued)

OTHER PUBLICATIONS

International Search Report (PCT/ISA/210) issued in PCT/KR2020/000875 dated Apr. 28, 2020.
(Continued)

*Primary Examiner* — Samir W Rizk
(74) *Attorney, Agent, or Firm* — Birch, Stewart, Kolasch & Birch, LLP

(57) ABSTRACT

Discussed is a memory having an application area that stores at least one application; a flash bootloader (FBL) area that includes codes for updating the application area; and a BUM module that is activated after a defect is detected in the FBL area, deletes the FBL area, writes binary code information of an FBL image into the FBL area, determines whether the binary code written into the FBL area matches binary code information of the FBL image, and is deactivated when the two binary code information match. The FBL image and the BUM module may be provided in the application area.

13 Claims, 6 Drawing Sheets

(51) Int. Cl.
  *G06F 1/30* (2006.01)
  *G06F 11/07* (2006.01)
  *G06F 11/14* (2006.01)

(56) References Cited

U.S. PATENT DOCUMENTS

| | | | |
|---|---|---|---|
| 8,732,527 | B2 | 5/2014 | Tabone et al. |
| 2005/0228978 | A1 | 10/2005 | Saliou et al. |
| 2006/0265582 | A1 | 11/2006 | Fan et al. |
| 2007/0083744 | A1 | 4/2007 | Seok |
| 2012/0054541 | A1 | 3/2012 | Byom et al. |
| 2013/0036300 | A1 | 2/2013 | Baik et al. |
| 2013/0047031 | A1 | 2/2013 | Tabone et al. |
| 2014/0304497 | A1 | 10/2014 | Park |
| 2016/0019383 | A1* | 1/2016 | Hanley .................. G06F 9/445 726/22 |
| 2016/0162268 | A1* | 6/2016 | Bush .................. H04L 12/6418 717/178 |
| 2017/0322796 | A1* | 11/2017 | Kim .................. G06F 11/1469 |

FOREIGN PATENT DOCUMENTS

| | | |
|---|---|---|
| KR | 10-0778293 B1 | 11/2007 |
| KR | 10-0907550 B1 | 7/2009 |
| KR | 10-1393034 B1 | 5/2014 |
| KR | 10-1418451 B1 | 7/2014 |
| KR | 10-2014-0121233 A | 10/2014 |
| KR | 10-2015-0075867 A | 7/2015 |
| KR | 10-1692839 B1 | 1/2017 |

OTHER PUBLICATIONS

Ju et al., "Development of Emergency Repairing Technique to Enhance the Reliability of the Automotive Convergence ECU Platforms", DBpia, 2015, pp. 821-823.

Anonymous: "Battery management system—Wikipedia", Dec. 14, 2018, pp. 1-6 XP055855267.

Daniel Bogdan et al., "Design and Implementation of a Bootloader in the Context of Intelligent Vehicle Systems". Nov. 12, 2017 IEEE Conference of Technologies for Sustainability (Sus Tech), IEEE, pp. 1-5 XP033344473.

Extended European Search Report dated Nov. 10, 2021, of the corresponding European Patent Application No. 20741742.9.

* cited by examiner

MEMORY, ERROR RESTORATION METHOD OF THE MEMORY, AND BATTERY DEVICE COMPRISING THE MEMORY

CROSS-REFERENCE TO RELATED APPLICATION(S)

Technical Field

This application claims priority to and the benefit of Korean Patent Application No. 10-2019-0006275 filed in the Korean Intellectual Property Office on Jan. 17, 2019, the entire contents of which are incorporated herein by reference.

The present disclosure relates to a memory, a method for restoring an error of the memory, and a battery device including the memory.

Background Art

A structure of software stored in a memory is formed of an application area and a flash bootloader (FBL) area.

When a code of the application area is corrupted or contains defects, the application area can be updated or reprogrammed through a code in the FBL area.

However, when there is a defect in the FBL area, it is not only difficult to find a defect in the FBL area, but it is impossible to update or reprogram the application area. In this case, there is a problem that a system including the memory needs to be disassembled and reprogrammed through update equipment, or the entire system needs to be replaced.

DISCLOSURE

Technical Problem

The present invention provides a memory that can restore from an error in a flash bootloader (FBL) when an error occurs in an FBL, a method for restoring the memory, and a battery device including the memory.

Technical Solution

A non-transitory, tangible computer readable memory for restoring an error in a flash bootloader (FBL) of the memory, comprising instructions stored thereon, that when executed on a processor, performs the steps of storing at least one application in an application area of the memory; updating, by the FBL, the application area, the FBL including binary code for updating the application area; activating a bootloader update manager (BUM) module of the memory after a defect is detected in the FBL area, deleting, by the BUM module, the FBL area, writing, by the BUM module, binary code information of an FBL image into the FBL area, determining, by the BUM module, whether the binary code written into the FBL area matches binary code information of the FBL image, and deactivating, by the BUM module, when the binary code of the FBL area matches the binary code information of the FBL image. The FBL image and the BUM module may be provided in the application area.

The memory further performs the step of carrying out a defect check of the flash bootloader code, by the FBL area, by being synchronized with a wake-up of a device including the memory.

The memory further performs the step of calculating, by the BUM module, a checksum of the binary code written into the FBL area, and deactivating the BUM module when the calculated value matches a reference checksum, the reference checksum being a checksum calculation value with respect to the binary code of the FBL image.

Alternatively, memory performs the steps of: calculating, by the BUM module, a checksum of the binary code written into the FBL area, and when it is determined that the calculation value and a reference checksum do not match, deleting, by the BUM module, the FBL area, writing, by the BUM module, binary code information of the FBL image to the FBL area, calculating, by the BUM module, a checksum of the binary code written into the FBL image, and determining, by the BUM module, whether the calculation value matches a reference checksum, the reference checksum being the calculated checksum value with respect to the binary code of the FBL image.

An error restoring method of a memory that includes an application area and a flash bootloader (FBL) area, the FBL area including binary codes for updating the application area, according to another aspect of the present invention includes: performing, by the FBL area, a defect check of a flash bootloader code by synchronizing with a wake-up of a device including the memory; activating a bootloader update manager (BUM) module when a defect is detected in the FBL area as a result of the defect check; deleting the FBL area, by the BUM module; writing binary code information of an FBL image into the FBL area, by the BUM module; determining whether the binary codes written into the FBL area match the binary code information of the FBL image, by the BUM module; and activating or deactivating the BUM module according to a result of the determination. The FBL image and the BUM module may be provided in the application area.

The performing the defect check of the flash bootloader code of the FBL area may include using a checksum of the flash bootloader code.

The determining whether the binary codes written into the FBL area match the binary code information of the FBL image, by the BUM module may include: calculating a checksum of the binary code written into the FBL area, by the BUM module; and comparing the calculated checksum value with a reference checksum, the reference checksum is a checksum calculation value with respect to the binary code of the FBL image.

The error restoring method of the memory may further include, deactivating the BUM module when the calculated value matches the reference checksum.

When the calculated value does not match the reference checksum, the BUM module may repeat the deleting of the FBL area, the writing of the binary code information of the FBL image into the FBL area, and the determining whether the binary codes written into the FBL area matches the binary code information of the FBL image.

The battery device may include: a battery cell assembly that includes a plurality of battery cells; and a battery management system that manages the battery cell assembly, wherein the battery management system includes the above-described memory that includes various applications required for collecting and processing state information with respect to the battery cell assembly and managing the battery cell assembly,

Advantageous Effects

The present disclosure provides a memory that can restore from an error in an FBL when an error occurs in an FBL, a method for restoring the memory, and a battery device including the memory.

MODE FOR INVENTION

Figure 1:
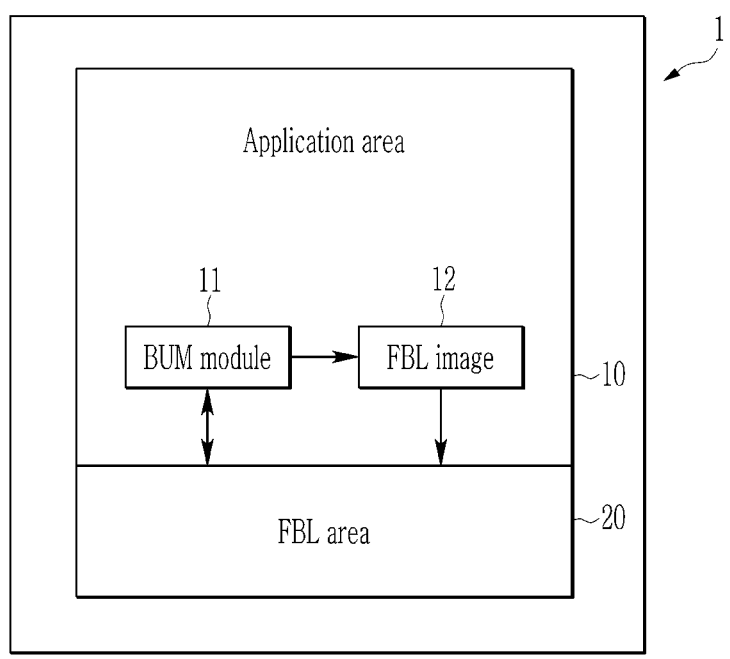
FIG. 1 shows a structure of a memory according to an exemplary embodiment.

A memory according to an exemplary embodiment of the present invention checks a state of an FBL area, and when detecting an error in the FBL area, the memory actives a bootloader update manager (BUM) to update the FBL area with an FBL image stored in a specific area. The memory may include an application area and the FBL area, the BUM may be located in the application area, and the FBL image may be stored in the application area.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 shows a structure of a memory according to an exemplary embodiment.

A memory 1 includes an application area 10 and an FBL area 20.

The application area 10 includes a bootloader update manager (BUM) module 11 and an FBL image 12.

Codes for updating the application area 10 are included in the FBL area 20. The application area 10 is updated according to the codes of the FBL area 20 when an application stored in the application area 10 needs to be updated or reprogrammed, when codes of the application area 10 are corrupted, or when the codes of the application area 10 include deficiencies. The FBL area 20 checks the FBL area 20 in synchronization with wake-up, detects for the presence of a defect, and activates the BUM module 11 when a defect in the FBL area 20 is detected.

After being activated, the BUM module 11 deletes the FBL area 20, writes binary code information of the FBL image 12 into the FBL area 20, and then determines whether binary codes written into the FBL area 20 match the binary code information of the FBL image 12. When the BUM module 11 determines that the binary codes written into the FBL area 20 match the binary code information of the FBL image 12, the BUM module 11 may be deactivated.

After the BUM module 11 is deactivated, the application 10 may be executed.

Figure 2:
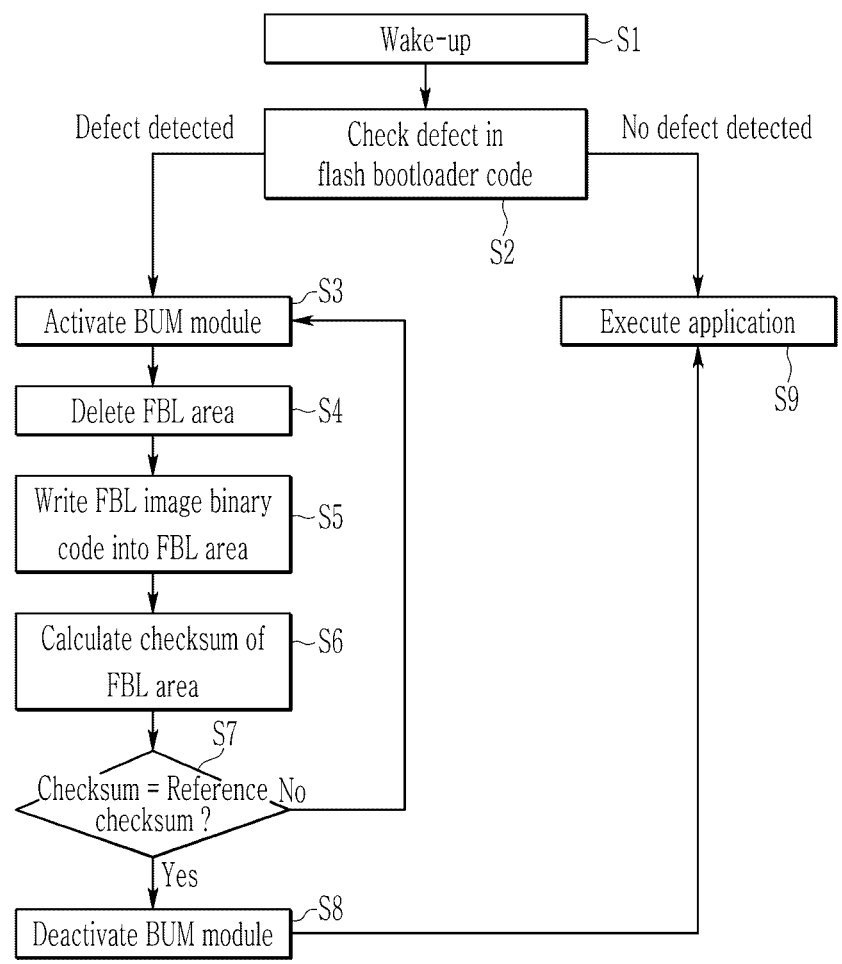
FIG. 2 is a flowchart of a method for detecting and restoring defects in the FBL area according to the exemplary embodiment.

FIG. 2 is a flowchart of a method for detecting and restoring defects in the FBL area according to the exemplary embodiment.

As shown in FIG. 2, a device that includes the memory 1 is woken up (step S1). The device including the memory may be various devices including an IC chip of an embedded system. For example, the device may be a battery, a vehicle, a smart phone, a smart watch, and the like.

After the wake-up, the FBL area 20 is synchronized by the wake-up and carries out a defect check of a flash bootloader code (step S2). For example, the FBL area 20 may apply a checksum algorithm to the binary code stored in the flash bootloader code, and determine whether the flash bootloader code is defected according to a checksum result.

The checksum is a method for testing whether there is a defect in the stored code or data, and may test whether there is a defect in codes stored in the flash code by comparing whether the sum of the binary code matches the sum of accurate codes. The method of calculating the checksum may be different for each checksum algorithm, and the algorithm may be determined according to design. In addition, the invention is not limited to the checksum, and instead of the checksum, the FBL area 20 may use various error detection methods capable of checking whether the flash bootloader code is defective.

When the FBL area 20 detects a defect as a result of the step S2, the memory 1 activates the BUM module 11 (step S3). The FBL area 20 informs a process that controls the entire operation of the memory 1 that the defect is detected in the FBL area 20, and the corresponding processor may activate the BUM module 11 or the FBL area 20 may direct the BUM module 11 to be activated. A detailed method for activating the BUM module 11 by detection of a defect is not limited thereto.

The BUM module 11 deletes the FBL area 20 after being activated (step S4).

The BUM module 11 writes binary code information of the FBL image 12 into an FBL area 20 (step S5).

The BUM module 11 calculates a checksum of the binary codes written into the FBL area 20 (step S6).

The BUM module 11 compares the checksum calculation value of the step S6 with a reference checksum, which is a calculated checksum value with respect to the binary code of the FBL image 12, to determine whether the two checksums match (step S7).

When the two checksums match as a result of the step S7, the BUM module 11 is deactivated (step S8). When the two checksums do not match, the activation state of the BUM module 11 is maintained and the process repeats from the step S3.

When there is no defect in the flash bootloader code in the step S2 and after deactivation of the BUM module 11 in the step S8, a required application 10 may be executed according to an input instruction or a predetermined routine (step S9).

As described, when a defect is detected in the FBL area, the memory according to the exemplary embodiment deletes the FBL area through an area other than the FBL area, for example, a BUM module and a FBL image in the application area, and then normally updates the FBL area.

Thus, even when a defect occurs in the FBL area, the FBL area can be updated while remarkably reducing time and cost compared to a conventional art without additional changing of the entire system that includes the memory.

Although it is illustrated in FIG. 1 that the BUM module 11 and the FBL image 12 are included in the application area 10, the present invention is not limited thereto. At least one of the BUM module 11 and the FBL image 12 may be located in an area (hereinafter, referred to as an external area) other than the application area 10 and the FBL area 20 in the memory 1.

Figure 3:
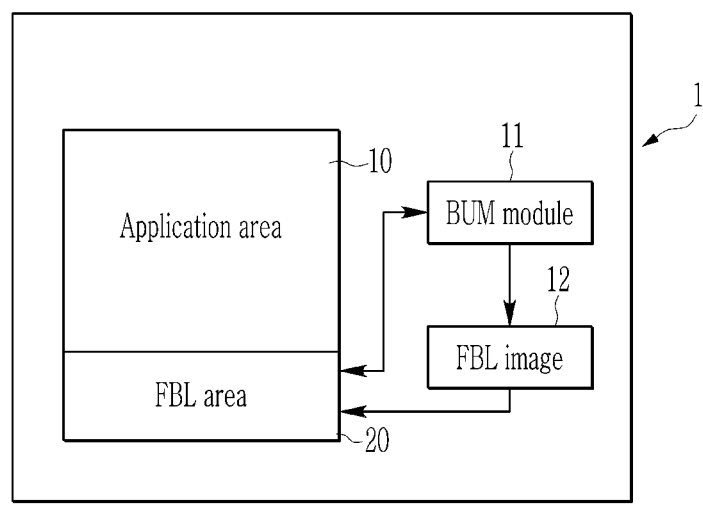
FIG. 3 shows a structure of a memory according to another exemplary embodiment.

FIG. 3 shows a structure of a memory according to another exemplary embodiment.

As shown in FIG. 3, a BUM module 11 and a FBL image 12 may be located in an external area.

Figure 4:
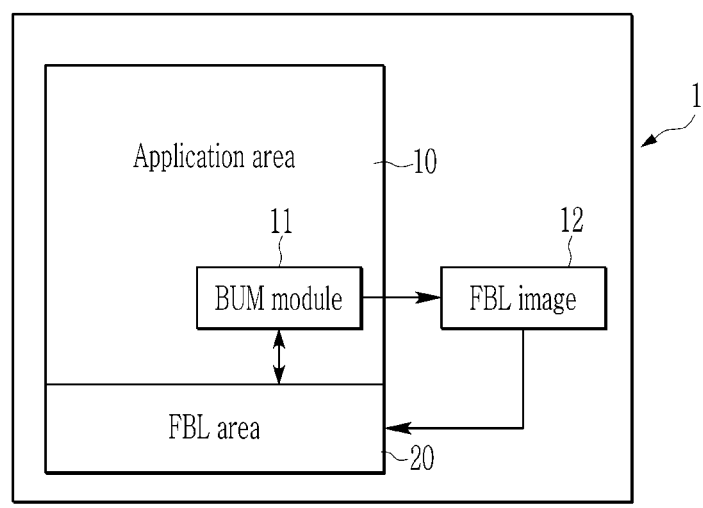
FIG. 4 is a structure of a memory according to another exemplary embodiment.

FIG. 4 is a structure of a memory according to another exemplary embodiment.

As shown in FIG. 4, a BUM module 11 may be located in an application area 10, and an FBL image 12 may be located in an external area.

Figure 5:
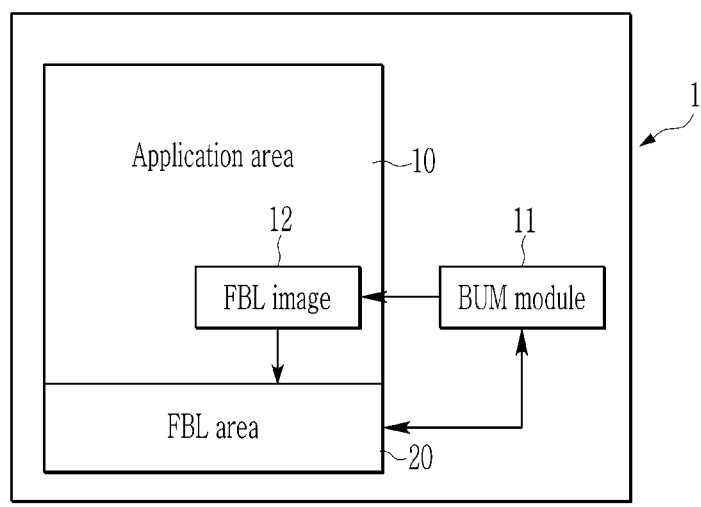
FIG. 5 is a structure of a memory according to another exemplary embodiment.

FIG. 5 is a structure of a memory according to another exemplary embodiment.

As shown in FIG. 5, a FBL image 12 may be located in an application area 10, and a BUM module 11 may be located in an external area.

In various exemplary embodiments of FIG. 3 to FIG. 5, a method for checking a state of an FBL area 20, and when a defect is detected in the FBL area, activating a BUM module 11 to update the FBL area 20 with an FBL image 12, is the same as the method in the exemplary embodiment described with reference to FIG. 1 and FIG. 2. Specifically, the memory according to the exemplary embodiment may be applied to a battery device.

Figure 6:
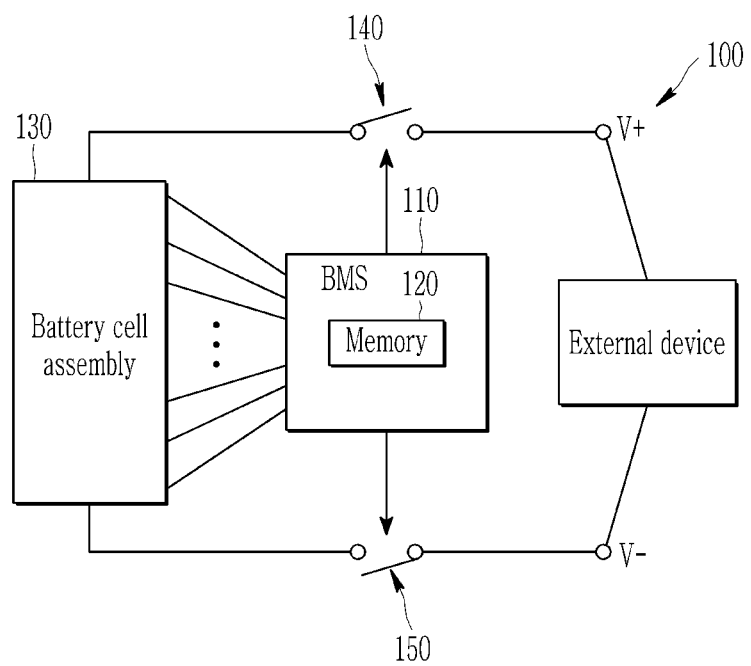
FIG. 6 shows a battery device including a memory to which the exemplary embodiment is applied.

FIG. 6 shows a battery device including a memory to which the exemplary embodiment is applied.

A battery device 100 includes a battery management system (BMS) 110, a battery cell assembly 130, and relays 140 and 150.

The BMS 110 collects and analyzes various pieces of information related to the battery device that include information on a plurality of battery cells to control charging/discharging of the battery device, battery cell balancing, a protection operation, and the like. The BMS 110 may include a memory 120, but the present invention is not limited thereto, and the memory 120 may be located outside the BMS 110 and may transmit and receive required information through wireless or wired communication.

The memory 120 may be implemented according to any one of the above-described exemplary embodiments. An application stored in the memory 120 is executed, and the BMS 110 may operate according to the application. That is, the memory 120 may store a plurality of applications required for battery monitoring and management. The BMS 110 may be driven according to applications executed in the memory 120. For example, the memory 120 may include an application for estimating a charging state and lifespan of a battery cell assembly, an application for detecting state information such as a current, a voltage, a temperature, and the like of a battery cell assembly, and a battery cell. In addition, the memory 120 may include an application for performing cell balancing of the battery, controlling charging and discharging of the battery, or performing a protection operation for the battery. That is, various applications required for the BMS 110 to collect, process, and manage the battery cell assembly can be stored in the memory 120.

As previously described, when the battery device 100 wakes up to supply power to an external device or receive power from the external device through a wake-up, the memory 120 checks whether there is an error in the FBL area. A detailed method is the same as the method described with reference to FIG. 1 and FIG. 2, and therefore no detailed description will be provided.

The battery cell assembly 130 includes a plurality of battery cells that are electrically connected. A predetermined number of battery cells are connected in series to form a battery module, and a predetermined number of battery modules are connected in series and in parallel to supply desired power.

Each of the plurality of battery cells that form the battery cell assembly 130 is electrically connected with the BMS 110 through a plurality of wires.

The relays 140 and 150 may be implemented as a relay or an n-channel type of transistor, and is connected in series between the battery cell assembly 130 and an external device. Each of the relays 140 and 150 may operate by a signal supplied from the BMS 110.

After wake-up of the battery device 100, an application for detecting battery state information may be executed in the BMS 110 to estimate a state of charge (SOC) of the battery cell assembly 130. As an example of applications stored in the memory 120, an application for estimating a state of charge (SOC) of the battery cell assembly 130 in the memory 120 will now be described.

Specifically, when an SOC estimation application among the plurality of applications stored in the memory 120 is executed, the 110 estimates an SOC according to the application. An estimation method of the SOC is determined according to the application.

For example, an SOC estimation application may estimate an SOC (hereinafter, referred to as a first SOC) by using a first battery modeling method and may estimate an SOC (hereinafter, referred to as a second SOC) by using a second battery modeling method, and the first battery modelling method and the second battery modeling method may be different from each other. The battery modeling method is a battery modeling method used to estimate a state of a battery having a non-linear characteristic, and may include an electrical circuit model, an electrochemical model, an analytical model, and a stochastic model.

Specifically, the BMS 110 may estimate a first SOC at the present stage based on an SOC estimated at the previous stage and information included in battery cell assembly state information by using an electrical circuit model as the first battery modeling method according to the SOC estimation application. As the second battery modeling, an electrochemical model may be used.

The electrical circuit model is a method for modeling input and output characteristics of a battery using an equivalent circuit implemented as an electrical circuit. The electrical circuit model has a merit that an operation process for SOC estimation is relatively simple, so that time required for the operation is not long and the load for the operation is not excessive. However, in the case of such an electrical circuit model, there is a problem that accuracy is somewhat lower.

On the other hand, the electrochemical model is a method for modeling the characteristic of a battery based on a chemical action occurring inside the battery. A representative example of such an electrochemical model is a Doyle-Fuller-Newman (DFN) model. The DFN model may model spatial and temporal changes in the lithium ion concentration present in a porous electrode, potential, intercalation kinetics, and current density between solid and electrolyte solution phases. Such an electrochemical model has a merit of very high accuracy.

The BMS 110 may acquire a highly accurate SOC estimation value (i.e., second SOC) based on state information of a battery cell assembly by using an electrical chemical model such as a DFN model according to the SOC estimation application. In addition, the BMS 110 may increase accuracy of the SOC (first SOC) estimation by reflecting the SOC estimation result (second SOC) with high accuracy according to the SOC estimation application in an input parameter.

For example, the BMS 110 may recognize the second SOC value as a first SOC of the previous stage according to the SOC estimation application, and may estimate a first SOC of the present stage by applying the received state information of the battery cell assembly and the first SOC of the previous stage to the first battery modeling method. Then, the first SOC value can be periodically corrected such that an error in the first SOC estimation can be periodically prevented from increasing, thereby improving accuracy in the SOC estimation.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A non-transitory, tangible computer readable memory for restoring an error in a flash bootloader (FBL) area of the memory, comprising instructions stored thereon, that when executed on a processor, performs the steps of:
storing at least one application in an application area of the memory, the application area being separate from the FBL area and including a bootloader update manager (BUM) module and an FBL image;
updating, by the FBL area, the application area, the FBL area including binary code for updating the application area;
activating the BUM module after a defect is detected in the FBL area;
deleting, by the BUM module, the FBL area;
writing, by the BUM module, binary code information of the FBL image into the FBL area;
determining, by the BUM module, whether the binary code written into the FBL area matches binary code information of the FBL image; and
deactivating the BUM module, when the binary code of the FBL area matches the binary code information of the FBL image.

2. The memory of claim 1, wherein the memory further performs the step of carrying out a defect check of the flash bootloader code, by the FBL area, by being synchronized with a wake-up of a device including the memory.

3. The memory of claim 1, wherein the memory further performs the step of calculating, by the BUM module, a checksum of the binary code written into the FBL area, and deactivating the BUM module when the calculated value matches a reference checksum, the reference checksum being is a checksum calculation value with respect to the binary code of the FBL image.

4. The memory of claim 1, wherein the memory further performs the steps of:
calculating, by the BUM module, a checksum of the binary code written into the FBL area, and
when it is determined that the calculation value and a reference checksum do not match:
deleting, by the BUM module, the FBL area,
writing, by the BUM module, binary code information of the FBL image to the FBL area,
calculating, by the BUM module, a checksum of the binary code written into the FBL area, and
determining, by the BUM module, whether the calculation value matches a reference checksum, the reference checksum being the calculated checksum value with respect to the binary code of the FBL image.

5. An error restoring method of a memory that includes an application area and a flash bootloader (FBL) area, the FBL area including binary codes for updating the application area and the application area being separate from the FBL area and including a bootloader update manager (BUM) module and an FBL image, the error restoring method comprising:
performing, by the FBL area, a defect check of a flash bootloader code by synchronizing with a wake-up of a device including the memory;
activating the BUM module when a defect is detected in the FBL area as a result of the defect check;
deleting the FBL area, by the BUM module;
writing binary code information of the FBL image into the FBL area, by the BUM module;
determining whether the binary codes written into the FBL area match the binary code information of the FBL image, by the BUM module; and
activating or deactivating the BUM module according to a result of the determination.

6. The error restoring method of the memory of claim 5, wherein the performing the defect check of the flash bootloader code of the FBL area comprises using a checksum of the flash bootloader code.

7. The error restoring method of the memory of claim 5, wherein the determining whether the binary codes written into the FBL area match the binary code information of the FBL image, by the BUM module, comprises:
calculating a checksum of the binary code written into the FBL area, by the BUM module; and
comparing the calculated checksum value with a reference checksum,
wherein the reference checksum is a checksum calculation value with respect to the binary code of the FBL image.

8. The error restoring method of the memory of claim 7, further comprising deactivating the BUM module when the calculated checksum value matches the reference checksum.

9. The error restoring method of the memory of claim 7, wherein, when the calculated value does not match the reference checksum, the BUM module repeats the deleting of the FBL area, the writing of the binary code information of the FBL image into the FBL area, and the determining whether the binary codes written into the FBL area matches the binary code information of the FBL image.

10. A battery device comprising:
a battery cell assembly that includes a plurality of battery cells; and
a battery management system that manages the battery cell assembly,
wherein the battery management system comprises a memory that includes various applications configured to collect and process state information with respect to the battery cell assembly and managing the battery cell assembly,
wherein the memory comprises:
an application area configured to store at least one application; and
a flash bootloader (FBL) area that includes binary codes configured to update the application area, the application area being separate from the FBL area and including a bootloader update manager (BUM) module and an FBL image; and wherein the BUM module is configured to:
  activate after a defect is detected in the FBL area,
  delete the FBL area,
  write binary code information of the FBL image into the FBL area,
  determine whether the binary code written into the FBL area matches binary code information of the FBL image, and
  deactivate when the binary code of the FBL area matches the binary code information of the FBL image.

11. The battery device of claim 10, wherein the FBL area carries out a defect check of a flash bootloader code by being synchronized with a wake-up of a device including the memory.

12. The battery device of claim 10, wherein the BUM module is configured to:
  calculate a checksum of the binary code written into the FBL area, and
  deactivate when the calculated value matches a reference checksum, the reference checksum being a checksum calculation value with respect to the binary code of the FBL image.

13. The battery device of claim 10, wherein the BUM module is configured to:
  calculate a checksum of the binary code written into the FBL area, and
  when it is determined that the calculation value and a reference checksum do not match:
    delete the FBL area,
    write binary code information of the FBL image to the FBL area,
    calculate a checksum of the binary code written into the FBL area, and
    determine whether the calculation value matches the reference checksum, the reference checksum being a calculated checksum value with respect to the binary code of the FBL image.

* * * * *